(12) United States Patent
Shah et al.

(10) Patent No.: US 7,043,010 B2
(45) Date of Patent: May 9, 2006

(54) SMART PHONEBOOK SEARCH

(75) Inventors: Samir Shah, Mountain View, CA (US); Binh Truong, Mountain View, CA (US); Ram Gupta, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 165 days.

(21) Appl. No.: 10/229,698

(22) Filed: Aug. 28, 2002

(65) Prior Publication Data
US 2004/0042614 A1 Mar. 4, 2004

(51) Int. Cl.
*H04M 1/26* (2006.01)
(52) U.S. Cl. .................................. 379/355.01
(58) Field of Classification Search ................ 709/224; 379/355.07, 355.09, 276.01, 278.07, 972, 379/355.01; 455/407, 416, 460, 564, 401
See application file for complete search history.

(56) References Cited

U.S. PATENT DOCUMENTS

| 6,266,774 | B1 | 7/2001 | Sampath et al. |
| 6,272,212 | B1* | 8/2001 | Wulforst et al. ............ 379/199 |
| 6,510,463 | B1* | 1/2003 | Farhat et al. ................ 709/224 |
| 6,594,480 | B1* | 7/2003 | Montalvo et al. ........... 455/401 |

* cited by examiner

*Primary Examiner*—Sinh Tran
*Assistant Examiner*—Walter F Briney, III

(57) ABSTRACT

A smart phonebook search method comprises collecting, from a customer, a phone number to use for a dial-up connection, filtering any national direct dialing prefix from the collected number, obtaining a country code from an operating system of the smart phonebook search, matching a pattern of a prefix of the collected number with area codes for a country of the customer to provide a closest entry for said connection, and selecting a phone number for said dial-up connection, the phone number having a customer provided area code and the operating system provided country code.

16 Claims, 3 Drawing Sheets

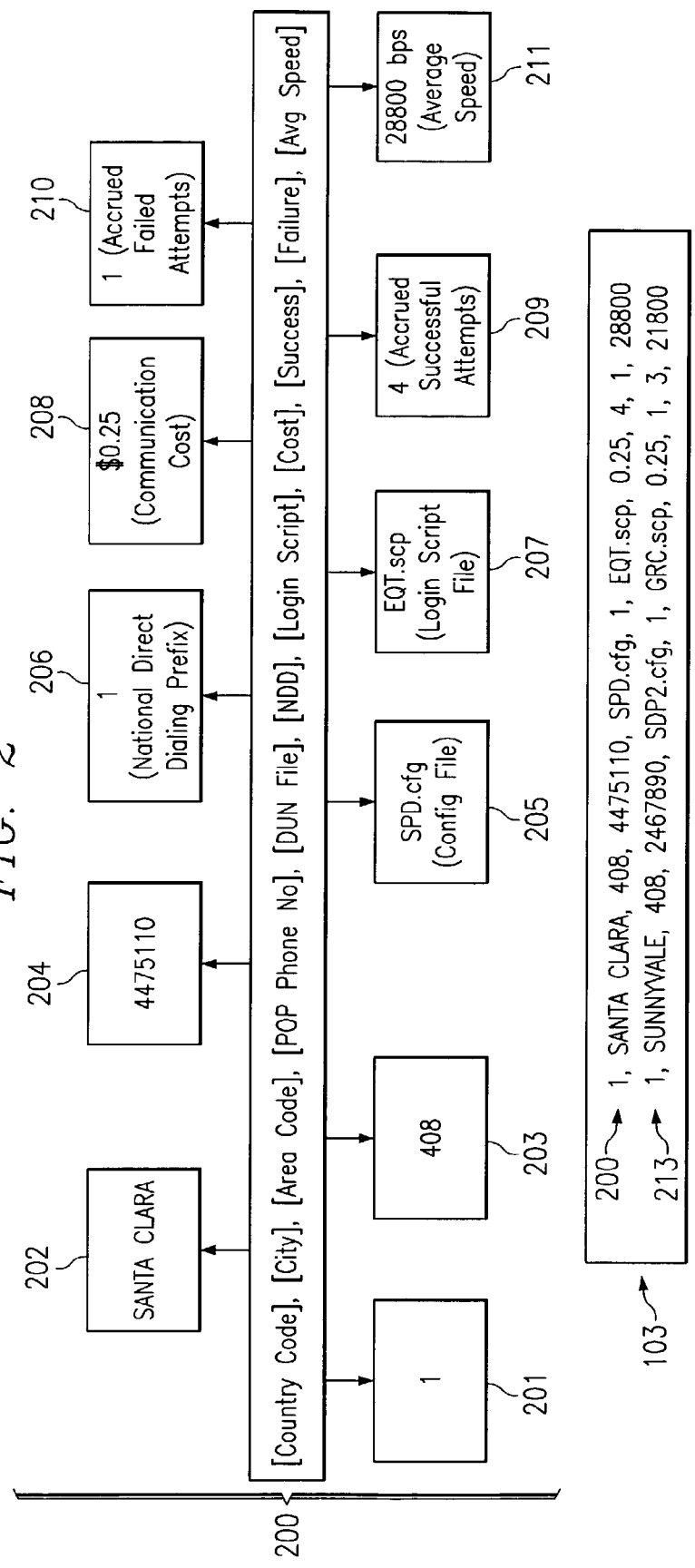

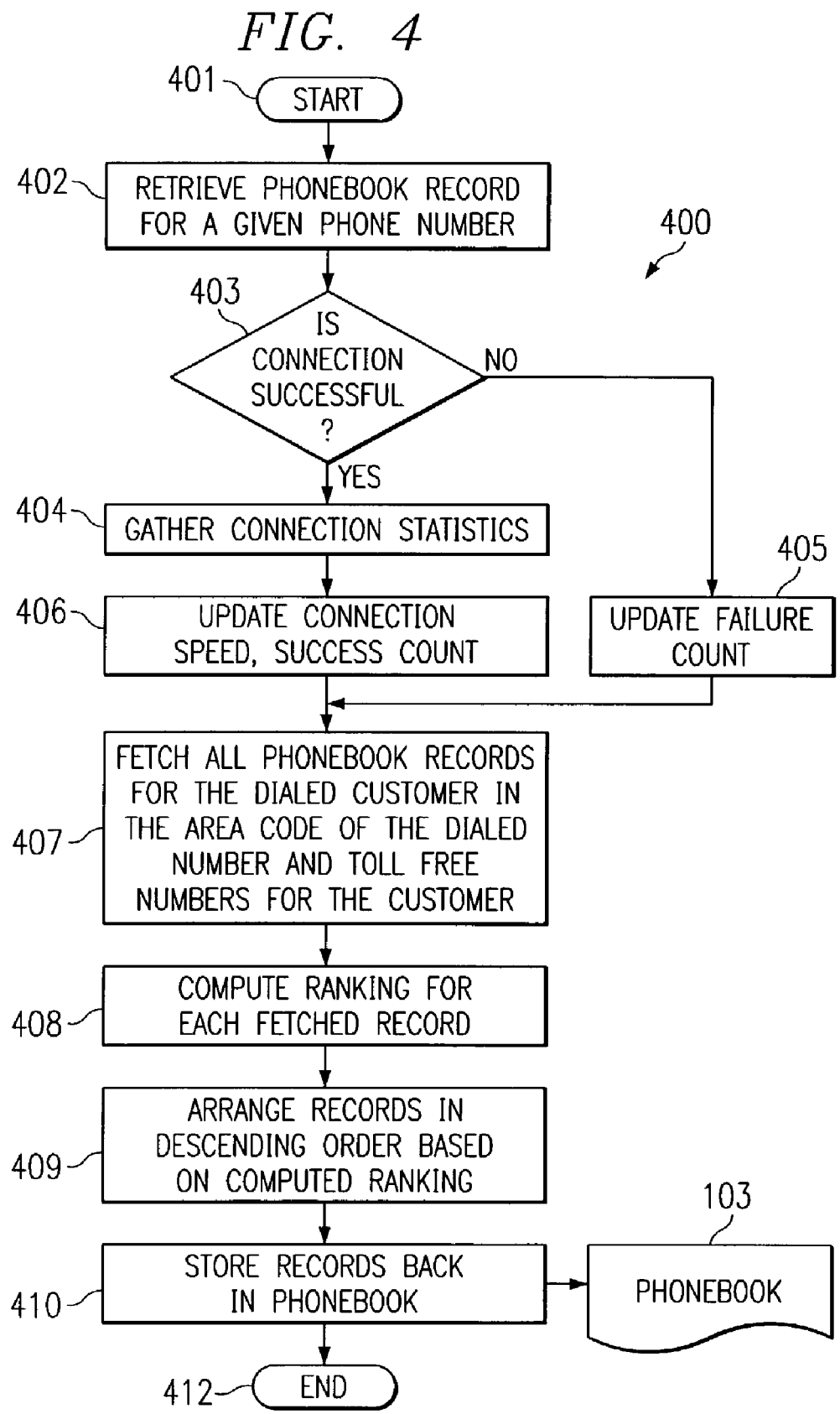

SMART PHONEBOOK SEARCH

RELATED APPLICATIONS

The present invention is related to concurrently filed, commonly assigned, application Ser. No. 10/229,677, entitled Content Synchronization Frameworks Using Dynamic Attributes and File Bundles for Connected Devices; and, application Ser. No. 10/229,851, entitled Smart Content Information Merge and Presentation; the disclosures of which are each incorporated herein by reference in their entireties.

FIELD OF THE INVENTION

The present invention is generally related to electronic service delivery and specifically to smart phonebook searches to obtain best possible phone numbers for dial-up connections.

BACKGROUND

Existing dialer programs problematically fail to efficiently provide the best phone number for dial-up connection for a particular customer. Typically when such dial-up connections are successful, the connection may be burdened with a slow connection speed and/or heavy communication costs associated with long distance charges and/or other tariffs.

Furthermore, although toll-free numbers may be re-routed to multiple locations, existing dialer programs do not preferentially select toll-free numbers to enhance reliability of dial-up connections while reducing communication costs.

Also, existing dialers fail to employ connection statistics, such as successful connect rates and connection speeds for a specific phone number for each customer. Finally, existing dialer phonebooks typically fail to continually shuffle or rearrange a ranking of phone numbers to consistently provide the optimal phone number for each dial-up attempt

SUMMARY OF THE INVENTION

An embodiment of a smart phonebook search method comprises collecting, from a customer, a phone number to use for a dial-up connection, filtering any national direct dialing prefix from the collected number, obtaining a country code from an operating system of the smart phonebook search, matching a pattern of a prefix of the collected number with area codes for a country of the customer to provide a closest entry for said connection, and selecting a phone number for a dial-up connection, the phone number having a customer provided area code and the operating system provided country code.

A further embodiment of a smart phonebook search method for dial-up connection numbers comprises retrieving at least one highest ranked phonebook record, the record comprising, at least in part, a phone number to initiate a dial-up connection, gathering connection statistics for an attempted dial-up connection via the retrieved phone number comprising: updating a successful connection count for the phone number, updating an unsuccessful connection count for the phone number and updating a connection speed entry for the phone number; fetching phonebook records for a same area code as the phone number, ranking the fetched phonebook records based, at least in part, on connection costs, the successful connection count, and the connection speed, arranging the phonebook records in rank order, and storing the records in the phonebook.

An embodiment of a smart phonebook comprises dial-up connection phone number records sorted by, a country code and an area code, the records comprising, at least in part the country code, a city, the area code, a phone number, a dial-up configuration file, a national direct dialing prefix, a login script file, communication costs for connecting to the number, a count of accrued successful connection attempts, a count of accrued failed connection attempts, and an average connection speed of the successful connection attempts; wherein the records with a given county code and a given area code are ranked, at least in part, based on the connection costs, the accrued successful connection attempts and the average connection speed.

BRIEF DESCRIPTION OF THE DRAWING

FIG. 2 is a diagrammatic illustration of an embodiment of a generated smart phonebook record in accordance with the present invention.

FIG. 4 is a flowchart of operation of a further embodiment of a smart phonebook search in accordance with the present invention.

DETAILED DESCRIPTION

Figure 1:
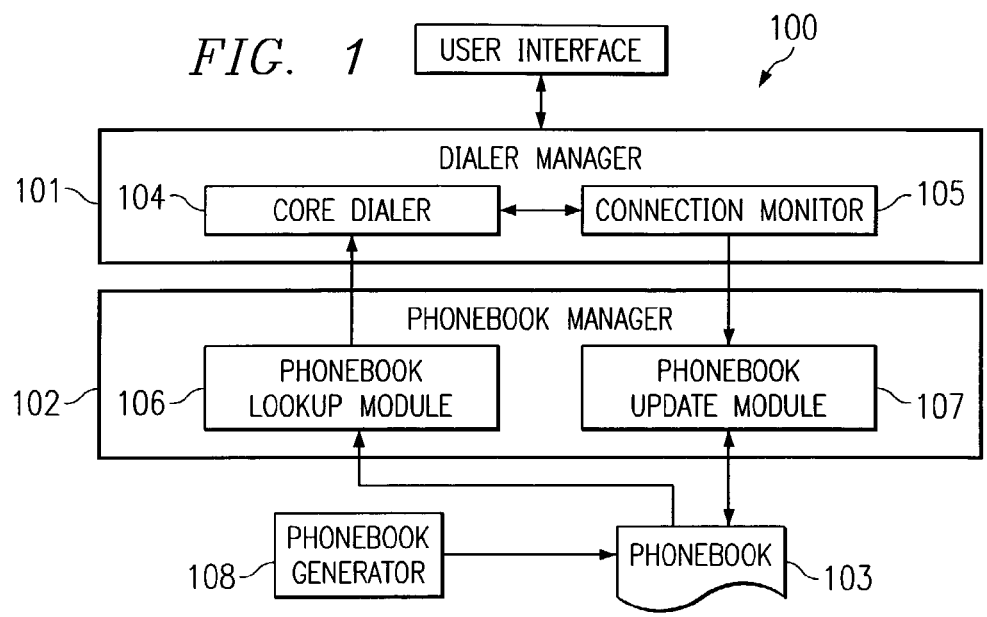
FIG. 1 is a diagrammatic illustration of an embodiment of a smart dialer service employing an embodiment of a smart phonebook search in accordance with the present invention.

The present invention is directed to systems and methods for a smart phonebook search that is preferably a component of a service delivery platform (SDP) application. In accordance with the present invention, a smart phonebook search to obtain a best possible dial-up connection phone number preferably factors in heuristic data on communication link speed, cost, successful and unsuccessful connection attempts, and user provided information. The present invention preferably maximizes the chances of customer connection attempts being successful with higher link speed and a lower communication tariff.

The present smart phonebook search is preferably a part of a smart dialer service that is in turn preferably a part of the SDP application is framework. This smart dialer service preferably employs a sophisticated phonebook search algorithm that may be resident on customer equipment to implement the present smart phonebook search, thereby locating best possible phone numbers, that give a highest communication link speed and cheapest communication tariff for a dial-up connection for a customer.

In the present systems and methods, each phone book record may have: a different dial-up configuration, such as a dial-up network (DUN) file parameter in the record; a unique log-in process, hence a different partner network is preferably supported in accordance with the present invention; and different connection statistics. In accordance with embodiments of the present invention, real time shuffling of phonebook records based on higher ranking provides an optimized connection. Additionally, whereas toll-free numbers are typically more reliable for ensuring a connection, the present systems and methods preferentially employ toll-free numbers to enhance successful dial-up connection.

Advantageously, the present systems and methods: increase chances of getting higher link speed connection during each connection attempt; increase chances of a connection attempt being successful; and reduce communication charges. Preferably, the present phonebook search algorithm becomes efficient by algorithm intelligence and optimum organization of phone records in the phonebook, shortening lookup time.

The present phonebook search preferably uses data sets comprising user provided information, heuristic and/or historical data concerning communication link speed, communication cost, and successful/unsuccessful connection attempts over time. The historical data is preferably collected, by a smart dialer service, for every dial-out attempt, successful and unsuccessful, and a weighted average is preferably calculated and persistently saved, locally, for future reference.

During a phonebook search, phone numbers with higher weightage values are preferably chosen and the chosen numbers are preferably presented to a user for selection purposes. Alternatively, the present systems and methods may automatically employ the highest ranking number to establish a dial-up connection. Additionally, the present phonebook search preferably employs closest pattern matching to locate numbers that are within user provided information such as area and/or region code and/or country code, or the like. The present phonebook search is also preferably adaptive in nature, for example, to locate a number with partial user provided information.

Turning to FIG. 1, a preferred embodiment of dialer 100 employing the present smart phonebook search comprises dialer manager module 101, phonebook manager module 102 and a generated phonebook module 103. Dialer manager 101 is preferably comprised of a plurality of components such as core dialer 104 and connection monitor 105. In accordance with embodiments of the present invention one or more of these components may reside on customer equipment. Core dialer 104 is preferably responsible for establishing and breaking point-to-point protocol (PPP) connections over the public switched telephone network (PSTN) or the like. Core dialer 104 preferably performs call control operations and interacts with the operating system related to the SDP application, including dialer 100. Preferably, connection monitor 105 is responsible for gathering a variety of statistics for an established PPP connection. These statistics may include connection speed, connection duration, connection success or failure information and amount of data transfer carried out over a connection. Connection monitor 105 preferably captures this information in real time and persistently stores this information in an accrued form. The accrued information may later be used by other modules 102 and 103 and core dialer 104 when selecting best-suited phone numbers for subsequent connection calls. Phonebook manager 102 preferably comprises a plurality of components, such as phonebook lookup module 106 and phonebook update module 107.

Phonebook generator 108 preferably transforms a point of presence (POP) service provider's phonebook or other unprocessed phonebook entries into a format that phonebook manager 102 may employ. Generated and/or transformed phonebook 103 may be organized in optimal fashion such as by performing sorting of country code and area code preferably in an ascending manner and removing duplicate records to make subsequent phone book lookups more efficient.

Turning to FIG. 2, organization of example phonebook entry 200, as may be stored in phonebook 103 of the present invention, is diagrammatically illustrated. Fields of a phonebook record may vary in content and/or organization. However, by way of example, field 201 of phonebook entry 200 is shown to be the PSTN country code of the user. A city name, preferably derived from the phone number, preferably appears in another field, 202. City name 202 may be used for search functions and is preferably indicated as "toll-free", or the like, for toll-free numbers to facilitate searching for, and sorting of, toll-free numbers. The area code, input by the user or derived by the lookup module, preferably makes up field 203. The local POP number is preferably indicated in field 204. Field 205 preferably indicates a DUN configuration file used to connect the customer's connected device or appliance to the POP network, employing the POP number. Preferably, a national direct dialing (NDD) prefix for the county of the phone number is indicated in field 206. A login script file name to access the POP network is preferably indicated in field 207. The communication cost for connecting to the number indicated in fields 201, 203 and 204, in a price per minute or other standardized format, is preferably contained in field 208. Field 209 preferably contains the total number of successful attempts by the system that have been made to connect with the POP network employing the phone number indicated in fields 201, 203 and 204. The number of failed attempts to connect with the POP network employing the number indicated in fields 201, 203 and 204 is preferably shown in field 210. The average speed of successful connections with the POP network employing the phone number indicated in fields 201, 203 and 204 is preferably shown in field 211. Preferably a delimiter, such as the illustrated comma, is used to set off each of the fields.

Therefore, complete example phonebook records 200 and 213 are preferably organized as illustrated in the lower portion of FIG. 2 wherein. A portion of phonebook 103 is shown. By way of example, records 200 and 213 ranked in an order dictated, at lest in part, by average connection speed (field 211) and successful connection attempts (field 209).

Figure 3:
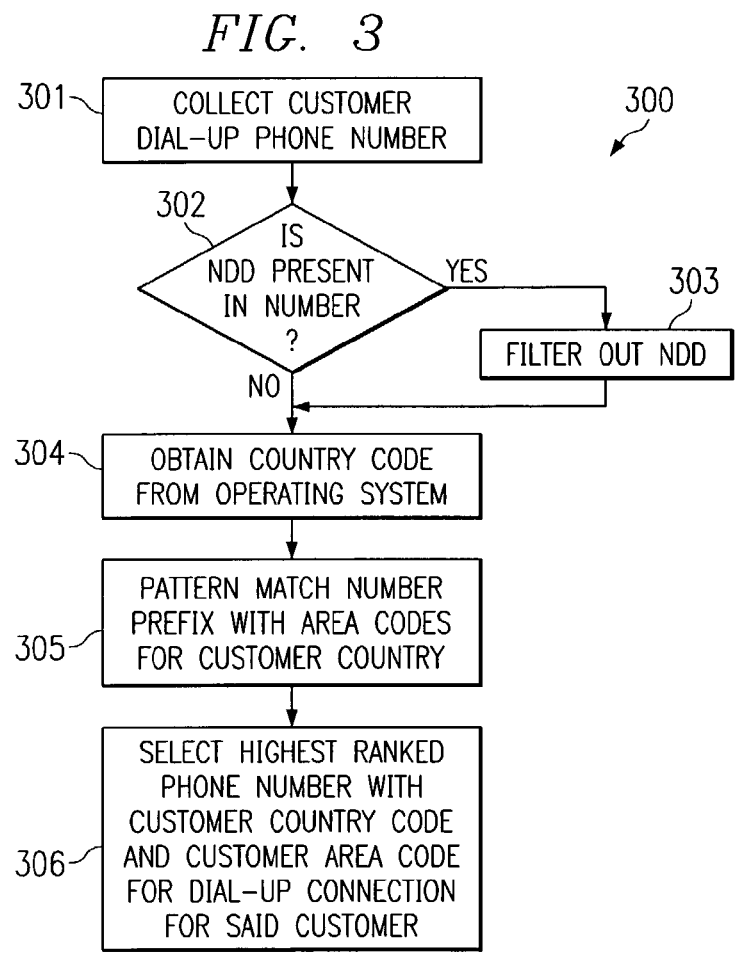
FIG. 3 is a flowchart of operation of an embodiment of a smart phonebook search in accordance with the present invention.

Turning to FIG. 3, a phonebook lookup module, e.g., phonebook looking module 106 of FIG. 1, preferably initially employs method 300 to select phone numbers based on country and area codes as illustrated. A country code of a user is preferably obtained automatically from an operating system for the SDP application that is employing the present phonebook search. As a result, the only information a preferred embodiment of the present phonebook lookup module needs to obtained from the user or customer by manual entry, at box 301, is either an area code or a phone number that includes the area code. Before performing a lookup, the phonebook lookup module preferably ensures that a user-entered area code does not contain an NDD prefix at 302. If an NDD is present in an area code, the phonebook lookup module preferably filters the NDD out at box 303. The country code from which the dialup connection will originate is preferably obtain from the operating system for the present SDP application at 304. If the user has not separately entered an area code and only provided a phone number that includes an area code, the lookup algorithm preferably performs pattern matching at box 305, matching prefix digits of the provided phone number with area codes in phonebook records for a given country, maintained by the present invention and/or the SDP, to get closest and highest ranked phone number entries for connection attempts.

To locate highest ranked phone numbers quickly at box 306, the phonebook lookup module preferably finds a country block using a customer's operating system regional settings in conjunction with existing search algorithm(s). A country block, in the phonebook, preferably contains POP phone number record(s) for a given country. Since phonebook records are preferably organized per country block by the present invention, the module stops searching once all numbers from a country block are searched.

Turning to FIG. 4, the phonebook manager preferably performs a number of steps for phonebook look-up and update, as flow-charted in method 400. The illustrated embodiment of a smart phonebook search for dial-up connection numbers includes gathering connection statistics for a dialed phone number including, updating a successful connection count or an unsuccessful connection count for the phone number and updating a connection speed entry for the phone number.

After initiation at start box 401, phonebook look-up module 106 of phonebook manager 102 first retrieves a record for a given number in the phonebook at box 402. Retrieving a phonebook record for the phone number may include obtaining region specific dialing rules for the phone number, based on the county of the phone number. If connection to the number retrieved at 402 is successful at 403, the connection statistics are preferably gathered by the connection monitor at 404, and connection speed for that number is updated and the successful connection count for that number is increased at box 406. If connection to the number fails at 403, the connection failure count for that phone number is increased at box 405.

At box 407, all records for a given or preferred area code for a customer, including toll-free numbers, are retrieved or fetched. A ranking for each record is computed at box 408. The ranking for a given number is preferably computed based on criteria that preferably includes: connection charges; accrued success and failure connection history; and an average data throughput and/or connection speed. A phonebook update module, such as phonebook update module 107 of FIG. 1, preferably performs controlled, for a given country and area code, reshuffling of phonebook rankings with entries having higher ranked records sorted in phonebook 103 of FIG. 1 to the top of the listings. At box 409, in accordance with the present invention, phonebook records are arranged in descending rank order. In order to further increase successful connection chances, and to reduce costs, toll-free numbers are preferably moved to the top of these ranked listings. This update ensures best-suited phone number selection by the phonebook lookup module in subsequent connection attempts. At box 410, the records are stored in the phone book, overwriting previous records and thus their sorted rankings. The ranked listing with all attributes in the record is stored to enable efficient record retrieval during each subsequent connection attempt. This ends phonebook manage look-up and update 400 at 412.

What is claimed is:

1. A smart phonebook search method comprising:
    collecting from a customer at a customer computer a phone number to use for a dial-up connection;
    filtering any national direct dialing prefix from said collected phone number;
    obtaining a county code of the user from an operating system of said smart phonebook search;
    matching a pattern of a prefix of said collected phone number with area codes for a county of said customer to provide a plurality of closest phone numbers for said dial-up connection; and
    selecting a phone number from said plurality of closest phone numbers for said dial-up connection based an a statistical analysis performed on said plurality of closest phone numbers at the customer computer, said selected phone number having a customer provided area code found in the collected phone number and said operating system provided country code.

2. The method of claim 1 wherein said collecting step further comprises collecting an area code and phone number from which said customer is connecting.

3. The method of claim 1 wherein said plurality of closest phone numbers with a given county code and a given area code are ranked, at least in part, based on connection costs, accrued successful connection attempts and average connection speed for each of said phone numbers.

4. The method of claim 3 wherein said selecting comprises selecting a highest ranked of said plurality of closest phone numbers with a given country code and a given area code.

5. The method of claim 4 wherein said rank is further based on a count of unsuccessful connection attempts and connection reliability of an associated number.

6. The method of claim 1, wherein selecting further comprises selecting a phone number for said dial-up connection from said plurality of closest phone numbers ranked based on at least one factor only associated with the customer computer.

7. The method of claim 6, wherein the at least one factor comprises at least one of connection costs, accrued successful connection attempts and average connection speed.

8. A smart phonebook search method for dial-up connection numbers for a customer computer, the method comprising:
    at the customer computer;
        retrieving at least one highest ranked phonebook record, said record comprising, at least in part, a phone number to use for a dial-up connection;
        gathering connection statistics relevant to the customer computer for an attempted dial-up connection via said retrieved phone number comprising:
            updating a successful connection count for said phone number;
            updating an unsuccessful connection count for said phone number; and
            updating a connection speed entry for said phone number;
        fetching phonebook records for a same area code as said phone number;
        ranking said fetched phonebook records using a statistical analysis based, at least in part, on connection costs, said successful connection count and said connection speed;
        arranging said phonebook records in a descending rank order;
        storing said records in said phonebook; and
        attempting said dial-up connection with the highest ranked phone book record of the arranged phonebook records.

9. The method of claim 8 wherein said ranking further comprises assigning records with toll-free numbers high rankings.

10. The method of claim 8 wherein said arranging comprises, at least in part, placing said toll-free numbers at atop of said rank order.

11. The method of claim 8 wherein said storing overwrites previous phonebook records and associated rankings.

12. The method of claim 8 wherein said ranking is further based on said unsuccessful connection count and connection reliability.

13. The method of claim 8 wherein said phonebook record comprises a plurality of fields selected from a group of fields consisting of:
    a country code;
    a city;

an area code;
a phone number;
a dial-up configuration file name;
a national direct dial prefix;
a login script file;
a communication cost associated with a phone number;
accrued successful attempts to connect with a phone number;
accrued unsuccessful attempts to connect with a phone number;
a speed of connection using a phone number;
an average speed of connection using a phone number; and
data throughput of connection using a phone number.

14. The method of claim 13 wherein said city is the same for all toll-free phone numbers.

15. The method of claim 14 wherein said city is indicated as "toll-free" for toll-free phone numbers.

16. The method of claim 8 wherein said connection speed is a data throughput speed of said connection.

* * * * *

UNITED STATES PATENT AND TRADEMARK OFFICE
CERTIFICATE OF CORRECTION

PATENT NO.         : 7,043,010 B2
APPLICATION NO.    : 10/229698
DATED              : May 9, 2006
INVENTOR(S)        : Samir Shah et al.

It is certified that error appears in the above-identified patent and that said Letters Patent is hereby corrected as shown below:

In column 5, line 55, in Claim 1, delete "county" and insert -- country --, therefor.

In column 5, line 58, in Claim 1, delete "county" and insert -- country --, therefor.

In column 6, line 5, in Claim 3, delete "county" and insert -- country --, therefor.

In column 6, line 27, in Claim 8, after "computer" delete ";" and insert -- : --, therefor.

In column 6, line 53, in Claim 9, after "toll-free" insert -- phone --.

In column 6, line 56, in Claim 10, delete "atop" and insert -- a top --, therefor.

Signed and Sealed this

Twenty-fifth Day of August, 2009

David J. Kappos
*Director of the United States Patent and Trademark Office*